_US011863544B2_

United States Patent
Goerbing et al.

(10) Patent No.: US 11,863,544 B2
(45) Date of Patent: Jan. 2, 2024

(54) AUTHENTICATING A NODE IN A COMMUNICATION NETWORK OF AN AUTOMATION INSTALLATION

(71) Applicant: Siemens Aktiengesellschaft, Munich (DE)

(72) Inventors: Andrej Goerbing, Berlin (DE); Jonas Hurrelmann, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 89 days.

(21) Appl. No.: 17/695,247

(22) Filed: Mar. 15, 2022

(65) Prior Publication Data

US 2022/0303255 A1   Sep. 22, 2022

(30) Foreign Application Priority Data

Mar. 16, 2021   (EP) .................... 21162798

(51) Int. Cl.
*G06F 11/10*  (2006.01)
*H03M 13/29*  (2006.01)
(Continued)

(52) U.S. Cl.
CPC ........ *H04L 63/064* (2013.01); *H04L 63/1433* (2013.01)

(58) Field of Classification Search
CPC ................... H04L 63/064; H04L 63/1433
See application file for complete search history.

(56) References Cited

U.S. PATENT DOCUMENTS

| 8,495,360 B2 | 7/2013 | Falk et al. |
| 2006/0036856 A1 | 2/2006 | Kok |

(Continued)

FOREIGN PATENT DOCUMENTS

| CN | 101360020 A | 2/2009 |
| CN | 102461230 A | 5/2012 |

(Continued)

OTHER PUBLICATIONS

Li Zhiwei et al:"EAP Identity Authentication Scheme for Quantum Wireless Communication Based on Invisible State Transmission", Journal of Jixi University, No. 4, 1672 6758( 2016) 04 0043 5, Apr. 29, 2016; English abstract on the last page.

(Continued)

*Primary Examiner* — Guy J Lamarre
(74) *Attorney, Agent, or Firm* — Laurence A. Greenberg; Werner H. Stemer; Ralph E. Locher (57) ABSTRACT

A method authenticates nodes in a communication network of an automation installation. Respective authentication information is transmitted to an authentication server, which takes the authentication information as a basis for admitting or rejecting the nodes in the communication network as subscribers. In order to be able to perform an authentication of a node even in a communication network configured with redundancy, the communication network contains multiple nodes, each of which has at least two communication ports. The communication network executes a spanning tree protocol and at least two of the nodes use their mutually facing communication ports to interchange authentication requests and send the respective received authentication information to an authentication server, connected to the communication network, that uses the respective received authentication information to perform a check on the authenticity of the node and admits or rejects the node in the communication network based on the check.

13 Claims, 6 Drawing Sheets

(51) Int. Cl.
*G11C 29/52* (2006.01)
*H03M 13/35* (2006.01)
*G11C 29/00* (2006.01)
*G11C 29/44* (2006.01)
*G11C 29/04* (2006.01)
*H04L 9/40* (2022.01)

(56) References Cited

U.S. PATENT DOCUMENTS

| | | | |
|---|---|---|---|
| 2006/0271785 A1* | 11/2006 | Holtmanns | H04W 12/0431 |
| | | | 713/171 |
| 2007/0198837 A1* | 8/2007 | Koodli | H04W 12/0471 |
| | | | 713/153 |
| 2007/0271453 A1* | 11/2007 | Pohja | H04W 12/068 |
| | | | 713/153 |
| 2008/0198861 A1* | 8/2008 | Makela | H04W 12/06 |
| | | | 726/4 |
| 2008/0279096 A1 | 11/2008 | Sullivan et al. | |
| 2009/0187759 A1 | 7/2009 | Marsico | |
| 2011/0154454 A1 | 6/2011 | Frelechoux | |
| 2011/0200026 A1 | 8/2011 | Ji et al. | |
| 2012/0036560 A1* | 2/2012 | Wang | H04W 12/06 |
| | | | 726/4 |
| 2014/0177477 A1 | 6/2014 | Cachin et al. | |
| 2016/0219051 A1 | 7/2016 | Morita et al. | |
| 2018/0332457 A1 | 11/2018 | Thiebaut et al. | |
| 2020/0233402 A1 | 7/2020 | Sakic et al. | |
| 2020/0314144 A1* | 10/2020 | Gaál | H04L 63/126 |
| 2020/0366686 A1* | 11/2020 | Gaál | H04L 63/123 |

FOREIGN PATENT DOCUMENTS

| | | |
|---|---|---|
| CN | 103765808 A | 4/2014 |
| CN | 105592046 A | 5/2016 |
| CN | 106358188 A | 1/2017 |
| CN | 107295514 A | 10/2017 |
| CN | 110998461 A | 4/2020 |
| DE | 102006038592 A1 | 2/2008 |
| EP | 3461081 A1 | 3/2019 |
| FI | 20106049 A | 4/2012 |
| WO | 2012049363 A1 | 4/2012 |
| WO | WO 2015024588 A1 | 2/2015 |

OTHER PUBLICATIONS

Yang Bin et al:"Spanning Tree Protocol Principle Simulation Experiment Based on eNSP", Computer Engineering & Software, No. 2, DOI 10.3969/j.issn. 1003-6970.2017.02.026, p. 125-129,Feb. 15, 2017; English abstract.

* cited by examiner

AUTHENTICATING A NODE IN A COMMUNICATION NETWORK OF AN AUTOMATION INSTALLATION

CROSS-REFERENCE TO RELATED APPLICATION

This application claims the priority, under 35 U.S.C. § 119, of European Patent Application EP 21162798.9, filed Mar. 16, 2021; the prior application is herewith incorporated by reference in its entirety.

FIELD AND BACKGROUND OF THE INVENTION

The invention relates to a method for authenticating nodes in a communication network of an automation installation, wherein respective authentication information indicating the devices is transmitted to an authentication server and the authentication server takes the authentication information as a basis for admitting or rejecting the devices in the communication network as subscribers.

The invention also relates first to a node for connection to a communication network of an automation installation and second to a communication network having such a node.

Communication-enabled devices (subsequently also referred to as "nodes"), that is to say electronic devices that can be connected to a communication network and use the latter to interchange data with other electronic devices by transmitting applicable data telegrams, or messages, are used in many fields of technology today, e.g. in the automation of installations. One example of the use of such nodes in a communication network is an automation installation, in which network-enabled automation devices (also referred to simply as "devices" or "electronic devices" hereinafter) are connected to one another via Ethernet bridges of the communication network for the purpose of interchanging data telegrams. The nodes of such a communication network are consequently formed by the electronic devices and Ethernet bridges of the communication network. Automation installations are used for automating systems, e.g. electrical energy supply networks or electrical switchgear installations, and usually comprise automation devices (e.g. so-called field devices) arranged in the vicinity of primary components of the applicable installation, that is to say e.g. of the electrical energy supply network. In the case of an electrical energy supply network, such primary components may be for example electrical cables and lines, transformers, generators, motors or converters. The automation devices can be for example so-called electrical protection devices or field control devices installed in substations of electrical energy supply networks. In the jargon, such automation devices are often also referred to as so-called "IEDs" ("Intelligent Electronic Devices"). In this case, the automation devices are connected to the communication network and use the latter to interchange data telegrams comprising for example control commands, reports about events (e.g. threshold value contraventions), measured values or status reports as payload data.

Automation installations often constitute security-critical systems that need to be protected against unauthorized interventions and manipulations. Therefore, in the communication networks of such automation installations, usually only such nodes as have previously undergone a registration are permitted to interchange data with one another, in the course of which registration first their identity is ascertained and second their authorization to interchange data in the communication network is ascertained by a superordinate authority. This process is also referred to as "authentication".

There are various known methods regarding how a node can be authenticated in a communication network. As such, the standard IEEE 802.1X defines an authentication protocol that makes it possible to ensure that only authorized nodes can access a communication network (e.g. a LAN) via enabled communication ports ("access ports") of access points, such as e.g. Ethernet bridges. This port-based authentication according to IEEE 802.1X is often used in communication networks appertaining to information technology (IT). Use also occurs in the context of operation technology (OT), but here the method encounters its limits now and then owing to specific distinctive characteristics, as will be explained in detail later.

Figure 1:
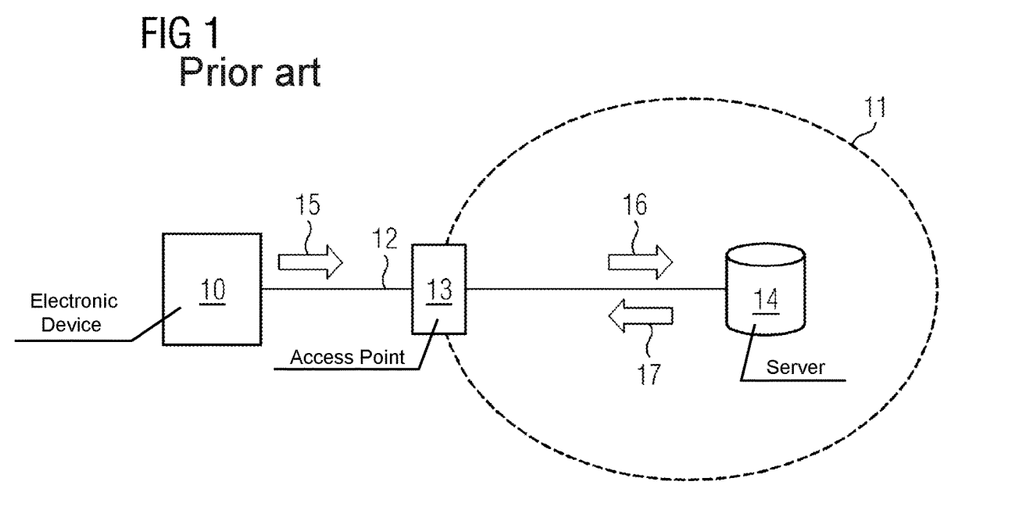
FIG. 1 is a block diagram showing a representation of a device to be authenticated in a communication network based on the prior art.

FIG. 1 shows an illustration based on IEEE 802.1X-2020, section 7.1, for explaining the authentication of an electronic device 10 for data interchange in a communication network 11. In this case, the device 10 ("host") is connected to an access point 13 of the communication network 11 via a point-to-point connection 12. The device 10 can be for example a personal computer, a communication-enabled terminal or an automation device of an automation installation. The access point 13 can be formed by an Ethernet bridge, for example. After the device 10 has been connected to the access point 13 and switched on, the device in the role of the "supplicant" sends a message 15 containing its authentication information to the access point 13. This can be done by means of the so-called "Extensible Authentication Protocol over LAN" (EAPOL). In this case, the access point 13 assumes the role of the "authenticator" and forwards the authentication information with a further message 16 to an authentication server 14, which can be e.g. a "Remote Authentication Dial-In User Service" (RADIUS) server. The forwarding of the authentication information can be effected for example with a so-called "Extensible Authentication Protocol" (EAP) message embedded in messages of an AAA protocol (authentication, authorization and accounting), for example of the RADIUS protocol.

The authentication server 14 checks the validity of the received authentication information. This can be done for example by checking whether the received authentication information matches reference authentication information, which can be contained for example in a database associated with the authentication server. An alternative consists in checking whether a certificate linked with the authentication information is trusted. Depending on the result of the check, the authentication server responds with an appropriate message 17 to the access point 13, which message causes the access point either to admit the device to the communication network (successful authentication) or to reject the device (failed authentication). After successful authentication, the access point opens its access port and the now authenticated device begins data interchange with other devices in the communication network.

In this way, it can be ensured that only authorized devices may connect to the communication network and the communication network is thus protected against manipulation by third parties and other security attacks, e.g. "eavesdropping", "spoofing" or "denial-of-service".

In addition to safeguarding against attacks, many installations operated in an automated manner also require a high level of failsafety. This requirement has major repercussions on the communication network by which the devices of such an installation are connected to one another. Such communication networks are therefore usually configured with redundancy, that is to say that the reliable transmission of data telegrams between the individual devices is ensured even in the event of the failure of a communication connection within the communication network. The term "communication connection" is intended hereinafter to encompass the complete transmission link between the respective devices, that is to say to encompass both an available (wired or wireless) transmission medium and the physical, communication-technological and logical linking thereof to the respective device (e.g. interfaces, communication apparatuses, protocol stacks). In addition, requirements are directed to the reliability of the communication in the communication network, for example the prevention of circling telegrams in ring-shaped communication network topologies.

One possibility for configuring a communication network reliably and with failsafety and, in so doing, ensuring largely seamless continuing operation of the automation installation even in the case of a disturbance of a communication connection is described as the so-called "Rapid Spanning Tree" protocol (RSTP) in the standard IEEE 802.1Q. One example of a communication network 20 operating in accordance with RSTP, for example a communication network in a substation of an energy supply network, is shown in FIG. 2.

Figure 2:
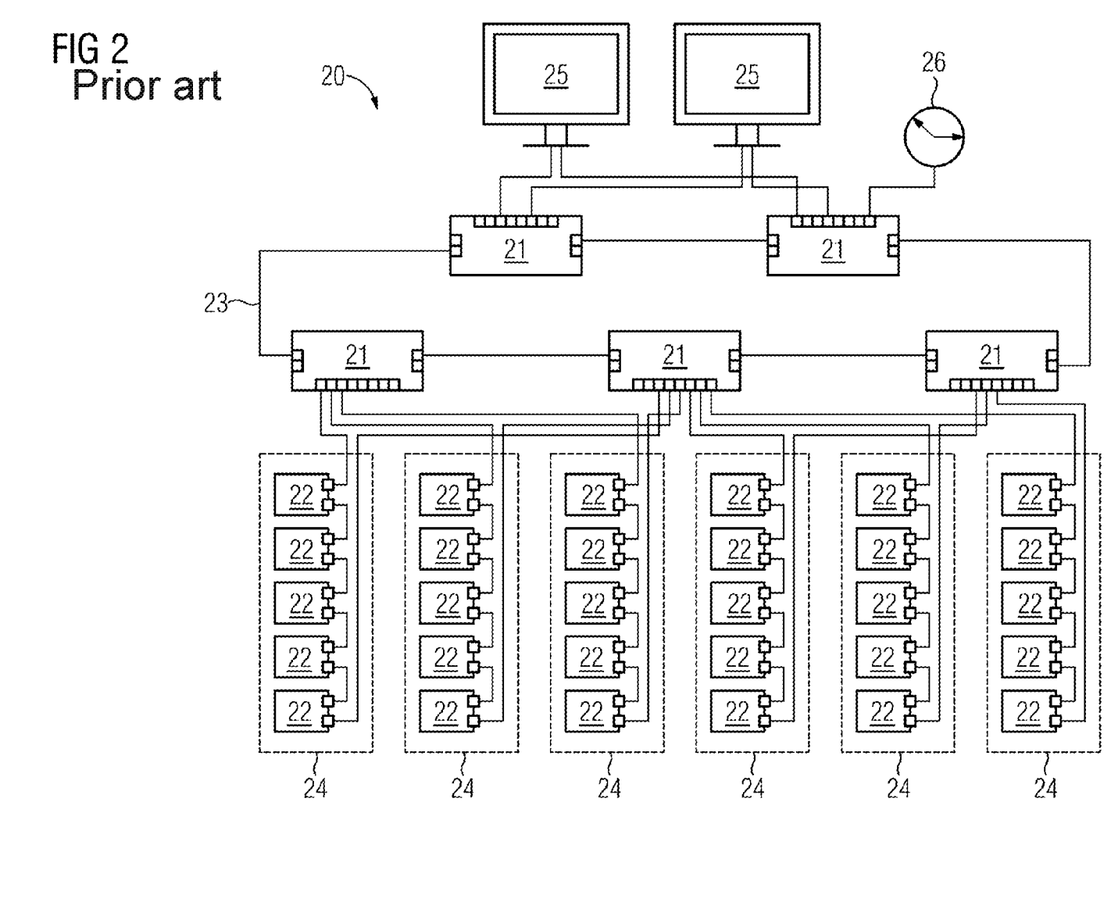
FIG. 2 is a block diagram showing an example of a communication network configured with redundancy in accordance with IEEE 802.1Q RSTP based on the prior art.

The communication network 20 of FIG. 2 comprises nodes in the form of Ethernet bridges 21 and electronic devices 22 (e.g. "intelligent electronic devices" IEDs), each of the devices 22 having two communication ports. The Ethernet bridges 21 are arranged in a ring 23. The devices 22 are arranged in multiple chains 24, in each case with the first device connected to a first Ethernet bridge 21 and the last device connected to a second Ethernet bridge 21. As a result, each chain 24 of devices 22 forms a separate ring with two respective Ethernet bridges 21. Overall, this produces a hierarchic structure having multiple rings, wherein the superordinate ring 23 consists of the concatenation of the Ethernet bridges 21, and the chains 24 each constitute subordinate rings that are each formed from multiple devices 22 and two Ethernet bridges 21. The superordinate ring 23 may have further devices such as workstations 25, timers 26, etc. connected to it for the purpose of data communication in the communication network 20.

The devices 22 implement a bridging function according to IEEE 802.1Q, wherein Ethernet telegrams that do not come from a device 22 or are not directed to the device are forwarded via the communication ports of this device 22. In this way, the communication between the devices 22 can be routed via the other devices 22 of the same chain 24.

Without additional measures, the design of the communication network 20 could result in circling telegrams, which would lead to the communication network 20 being "flooded" and would thus use up the bandwidth of the communication network completely. To avoid this, the nodes (switches 21 and devices 22) of the communication network 20 perform the RSTP functionality according to IEEE 802.1Q, which results in the ring structures of the communication network 20 being deliberately interrupted. This is done by actively blocking selected communication ports, to which a "discarding" status is assigned. If the data traffic in the communication network 20 is interrupted on account of interruption of a connection and/or failure of a node, this error is detected by the nodes of the communication network 20. By applying the RSTP rules, the communication network 20 reconfigures itself by unblocking one or more of the blocked ("discarding") communication ports and forwarding the messages, which results in uninterrupted data traffic being restored. RSTP communication networks may also have other structures, e.g. meshed structures, besides the hierarchic ring structure explained here.

RSTP communication networks are widely used in the field of industrial communication and in substations of energy supply networks. In this case, redundancy is achieved in the communication network 20 by the special structure and as a result of deliberate activation and blocking of communication ports creating redundant paths that can be reconfigured flexibly as a reaction to any disturbances in the communication network. This ensures that data traffic is possible between all connected devices 22 at any time.

The use of a communication network that operates on the basis of the RSTP method is known from the international patent application WO 2015/024588 A1, for example.

The procedure described above for authenticating a device is not designed for redundant communication networks, however. This is because, in contrast to devices connected to an access point of a communication network via a single communication port, devices in RSTP communication networks operating with redundancy are connected via two communication ports either to two adjacent devices or to one adjacent device and an adjacent Ethernet bridge.

A person skilled in the art is therefore faced with the object of also being able to perform an authentication of a node in a communication network that is designed with redundancy, in particular a communication network designed according to IEEE 802.1Q. RSTP.

SUMMARY OF THE INVENTION

To achieve this object, a method of the type described at the outset is developed according to the invention such that the communication network contains multiple nodes in the form of Ethernet bridges and electronic devices, each of which has at least two communication ports, and executes a spanning tree protocol, which involves at least one of the nodes being instructed to take an operating state of the communication network as a basis for blocking or activating at least one of its communication ports for the operational data traffic. At least two of the nodes use their mutually facing communication ports to interchange authentication requests containing their respective authentication information and send the respective received authentication information to an authentication server, connected to the communication network, that uses the respective received authentication information to perform a respective check on the authenticity of the respective node and admits or rejects the respective node in the communication network as a subscriber as the result of the check. The authentication information used can be for example a combination of username and password, an identification of the device, e.g. a secure device identifier (DevID), and/or a device certificate.

According to the invention, a respective reciprocal port-based authentication of at least two nodes of the communication network therefore takes place. Within the meaning of the IEEE 802.1X standard, the nodes take on the role of the supplicant and the role of the authenticator simultaneously, depending on which messages they are currently sending or receiving. The method according to the invention therefore has the advantage that there is no need to introduce proprietary changes regarding the RSTP method in order to be able to expand the functionality of the authentication, which means that interoperability with other subscribers of the communication network is not adversely affected in this regard.

The authentication request can consist of one or more messages. Accordingly, authentication responses sent by the authentication server as a reaction to the authentication request can consist of one or more messages. It is therefore possible for multiple messages to be interchanged between the device acting as authenticator and the authentication server.

The method according to the invention can be carried out at multiple, if not even all, nodes of the communication network in succession or simultaneously.

It may then be necessary for messages used for authentication (e.g. EAP/AAA messages) that are sent from one node in the direction of the authentication server to be forwarded by other nodes, regardless of whether or not the other nodes are already authenticated.

Authentication of a node can become necessary in this case for example owing to failure of a connection between two nodes or when a node is switched on.

As such, according to a first advantageous embodiment of the method according to the invention, there may be provision such that to restore an interrupted communication connection between two nodes, those two nodes that are arranged at the interruption location use their mutually facing communication ports to interchange authentication requests containing their respective authentication information and send the respective received authentication information to the authentication server.

This embodiment therefore relates to the case of an interrupted communication connection between two nodes. In this variant of the method according to the invention, the authentication server therefore receives two authentication requests from the two nodes situated at the interruption location.

The first node, in the role of the supplicant, sends an EAPOL message to the second node, which takes on the role of the authenticator in this regard. The latter then sends an EAP/AAA message to the authentication server. The second node, in the role of the supplicant, also sends an EAPOL message to the first node, which takes on the role of the authenticator in this regard. The latter then sends an EAP/AAA message to the authentication server.

This authentication communication proceeds with parallel timing, virtually simultaneously and independently of one another.

According to a second advantageous embodiment of the method according to the invention, there may be provision such that when a node is switched on, the switched-on node and its two adjacent nodes use their mutually facing communication ports to interchange authentication requests containing their respective authentication information and send the respective received authentication information to the authentication server.

This embodiment therefore relates to the case of a node being switched on for the first time or again, for example when the communication network is extended or a node is replaced. In this variant of the method according to the invention, the authentication server receives a total of four authentication requests from the nodes, two in each case for the switched-on node and each of its neighbor devices.

Specifically, there may also be provision for the communication network to implement a spanning tree protocol according to the standard IEEE 802.1Q RSTP. The method according to the invention is therefore in particular fully compatible with the standards IEEE 802.1X and IEEE 802.1Q.

According to a further advantageous embodiment of the method according to the invention, there may be provision for the nodes of the communication network to forward exclusively such messages as are used for authenticating a node or for reconfiguring the communication network according to the spanning tree protocol even if they themselves are not fully authenticated.

The effect that can be achieved thereby is that although such messages of an administrative type that are responsible for the authentication of the nodes and the reconfiguration of the communication network according to RSTP are forwarded at any time, messages that are used for operating the automation installation are blocked until complete authentication of the respective nodes has taken place.

According to a further advantageous embodiment of the method according to the invention, there may be provision such that, to check the authenticity of the nodes, the received authentication information is compared with reference authentication information and/or a certificate contained in the authentication information is checked for whether it is trusted, and the respective node is admitted in the communication network in the event of a match.

The reference authentication information in this case may have been deposited in a database of the authentication server during a system configuration, for example. The certificate can be checked for whether the authentication server regards the authority that issued the certificate as trusted, for example.

A further advantageous embodiment of the method according to the invention provides for a respective authentication response to be sent to the respective node as a reaction to the check, which response indicates whether or not the respective node may admit a respective other node in the communication network for the purpose of communication. As mentioned above, the authentication response can consist of one or more messages.

According to a further advantageous embodiment of the method according to the invention, there may be provision for a reconfiguration of the communication network to be performed with parallel timing in relation to the authentication of the nodes by means of the spanning tree protocol.

This reconfiguration takes into consideration the respective new status of the communication network, in particular a restored communication connection after an interruption and/or a node that has been switched on (for the first time or again). This allows the communication network to react promptly to a change.

A further advantageous embodiment of the method according to the invention also provides for the authentication requests to also be transmitted via such communication ports as are blocked in accordance with the application of the spanning tree protocol.

This ensures that an authentication of the communication connection can take place even in the event of an interrupted communication connection, or a switched-on node, encountering a communication port that is blocked for the operational communication according to RSTP.

According to a further advantageous embodiment of the method according to the invention, there may also be provision for the nodes to each have one first authentication apparatus, which is connected to a first communication port via a first port access control unit, and one second authentication apparatus, which is connected to a second communication port via a second port access control unit. The respective authentication apparatus generates the respective authentication request and transmits it via the communication port that is connected to it.

In this way, simple means can be used to initiate a separate authentication for each of the two communication ports of a node. In the case of nodes in the form of Ethernet bridges, the number of port access controllers and authentication apparatuses can vary in accordance with the number of available communication ports.

The aforementioned object is also achieved by a node for connection to a communication network of an automation installation, wherein the communication network contains multiple nodes in the form of Ethernet bridges and electronic devices, each having at least two communication ports, and is configured to execute a spanning tree protocol, which involves at least one of the nodes being instructed to take an operating state of the communication network as a basis for blocking or activating at least one of its communication ports for the operational data traffic.

According to the invention, there is provision for the node to be designed to perform a method as claimed in one of preceding claims.

All explanations given above and below concerning the method according to the invention are applicable with regard to the node according to the invention, and vice versa, mutatis mutandis; in particular, the node according to the invention is configured to perform the method according to the invention in any arbitrary embodiment or a combination of arbitrary embodiments. With regard to the advantages of the node according to the invention too, reference is made to the advantages described with respect to the method according to the invention.

One advantageous embodiment of the node according to the invention provides for the node to have a first authentication apparatus, which is connected to a first communication port via a first port access control unit, and a second authentication apparatus, which is connected to a second communication port via a second port access control unit. The respective authentication apparatus being configured to generate the respective authentication request and to transmit it via the communication port that is connected to it.

Finally, the aforementioned object is also achieved by a communication network of an automation installation, wherein the communication network comprises multiple nodes in the form of Ethernet bridges and electronic devices, each having at least two communication ports, and is designed to execute a spanning tree protocol, which involves at least one of the nodes being instructed to take an operating state of the communication network as a basis for blocking or activating at least one of its communication ports for the operational data traffic, and wherein the communication network has an authentication server.

According to the invention, there is provision for the communication network to be designed to perform a method as claimed in one of the method claims in order to authenticate a node. To this end, the components of the communication network interact in an appropriate manner.

In this context, there may also be provision for the node to be designed in accordance with either of the node claims.

The invention is explained more thoroughly below on the basis of an exemplary embodiment. The specific configuration of the exemplary embodiment should in no way be understood as restrictive for the general configuration of the method according to the invention and of the device according to the invention or of the communication network according to the invention; rather, individual configuration features of the exemplary embodiment can be combined arbitrarily freely among one another and with the features described above.

Other features which are considered as characteristic for the invention are set forth in the appended claims.

Although the invention is illustrated and described herein as embodied in authenticating a node in a communication network of an automation installation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

FIG. 6 is a block diagram showing an illustrative representation of a communication network when a node is switched on.

DETAILED DESCRIPTION OF THE INVENTION

Figure 3:
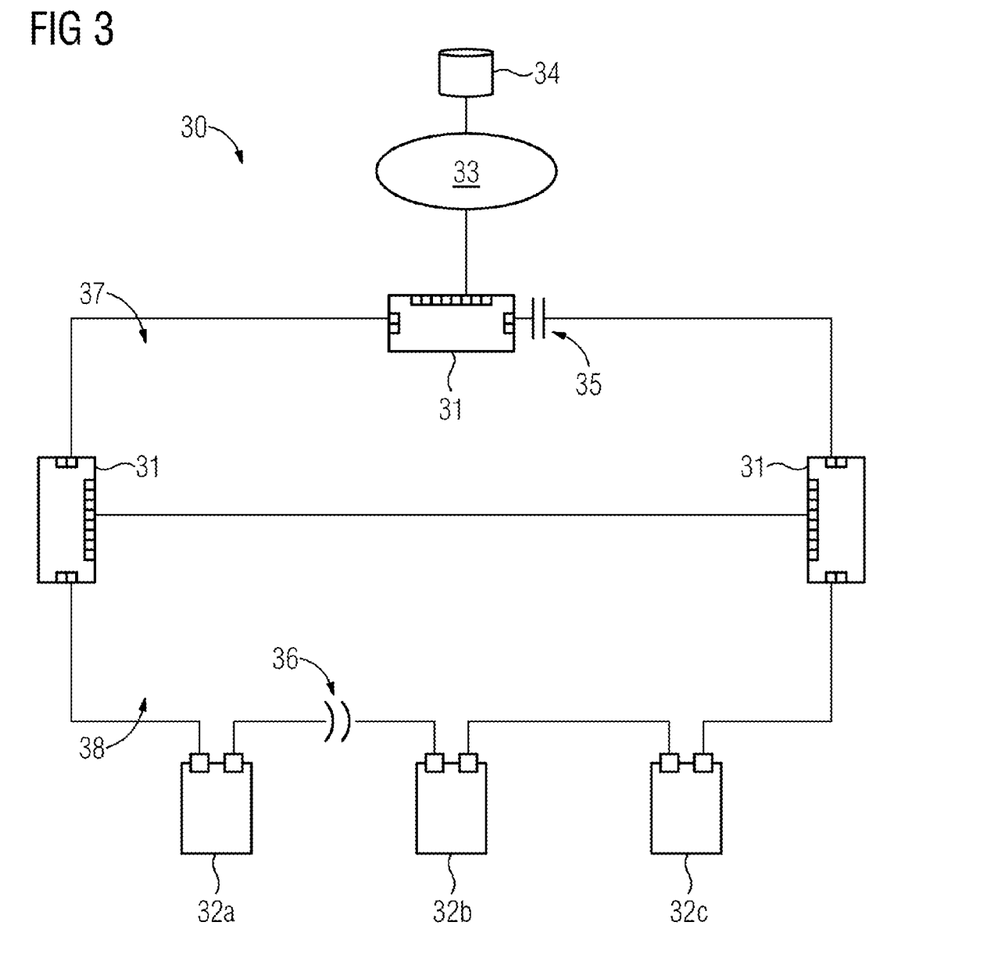
FIG. 3 is a block diagram showing an illustrative representation of an RSTP communication network with nodes connected thereto.

Referring now to the figures of the drawings in detail and first, particularly to FIG. 3 thereof, there is shown an illustrative communication network 30 containing Ethernet bridges 31 and communication-enabled electronic devices 32a-32c. The devices 32a-32c and the communication network 30 can belong for example to an automation installation of a technical system (e.g. of an energy supply network, of a manufacturing installation or of a process installation). In this case, the devices 32a-32c can be for example automation devices for regulating, controlling, monitoring and/or protecting the technical system. The Ethernet bridges 31 can be in the form of Ethernet switches, for example.

The devices 32a-32c each have two communication ports by which they are connected either to one another and/or to the Ethernet bridges 31.

As a result, the communication network 30 is configured such that multiple communication rings are produced; by way of illustration, two communication rings 37 and 38 are shown in the communication network 30 of FIG. 3, the first communication ring 37 being formed from the Ethernet bridges 31 and the second communication ring 38 being formed from the devices 32a-32c and two of the Ethernet bridges 31. In addition, one of the Ethernet bridges 31 has an authentication server 34 connected to it via a separate LAN (local area network) or WAN (wide area communication network) 33.

For a first case, it will be assumed that a connection between the devices 32a and 32b is interrupted at an interruption location 36. The (multiple) ring structure of the communication network 30 allows, even after the interruption, unique communication paths to be set up between each of the devices 32*a*-32*c* and Ethernet bridges 31 by deliberately blocking ("discarding") a communication port of one of the Ethernet bridges at the location 35. In this context, unique communication paths mean in particular the prevention of loops or meshes in which circling telegrams (messages) can arise. For this purpose, the spanning tree protocol (e.g. RSTP) is executed. Communication with each of the devices 32*a*-32*c* is therefore ensured despite the interruption location 36.

Figure 4:
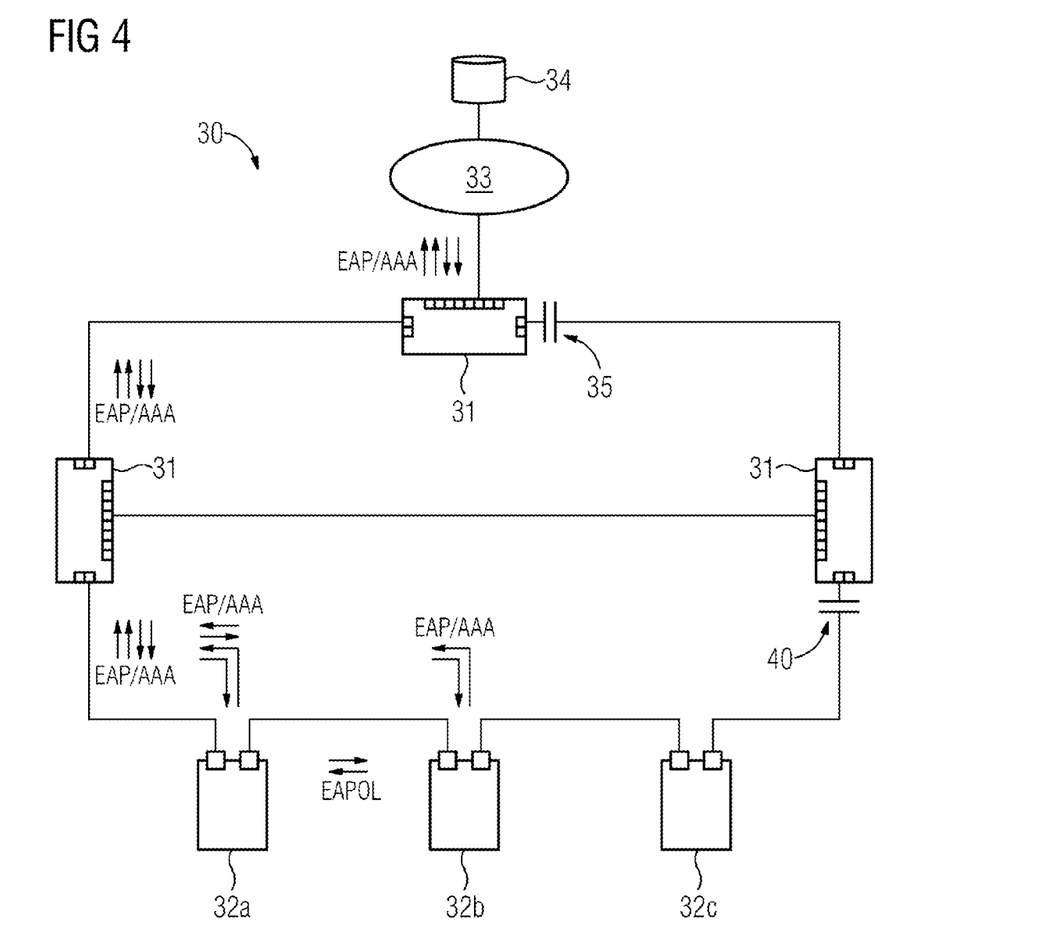
FIG. 4 is a block diagram showing an illustrative representation of the communication network of FIG. 3 after an interruption.

FIG. 4 shows the situation after the connection at the interruption location has been physically restored. Operational data communication via the restored connection is still prevented, however, until the two devices 32*a* and 32*b*, which directly adjoin the former interruption location 36, have authenticated themselves to one another. In principle, multiple or even all devices 32*a*-32*c* of the communication network 30 can perform an authentication. This can happen in succession or simultaneously. The messages to be interchanged for this purpose, e.g. EAP/AAA messages, need to be able to pass through other nodes regardless of whether or not said nodes have already been successfully authenticated. For the sake of simplicity, it will be assumed below that only the devices 32*a* and 32*b* are intended to be authenticated.

For this purpose, the two devices 32*a*, 32*b* each alternately take on the roles of "supplicant" and "authenticator" according to IEEE 802.1X for their mutually facing communication ports and use the restored connection to interchange authentication requests, e.g. in the form of EAPOL messages, which contain respective authentication information of the sending device. Such EAPOL messages are transmitted to the communication ports involved only locally between the two devices 32*a*, 32*b* and are not forwarded via the other communication port in each case.

Specifically, the device 32*a*, in the supplicant role, sends an authentication request (EAPOL message) to the device 32*b*, which takes on the authenticator role in this regard. Conversely, the device 32*b*, in the supplicant role, sends an authentication request (EAPOL message) to the device 32*a*, which takes on the authenticator role in this regard.

In the authenticator role, after receiving the authentication request, the devices each send the authentication information contained therein to the authentication server 34. The communication with the authentication server 34 takes place e.g. in the form of EAP/AAA messages.

These messages are sent within the communication network 30 along a path that is determined according to the spanning tree protocol. After the connection at the former interruption location has been restored, such paths are recalculated by the nodes (devices and Ethernet bridges) of the communication network and lead to reconfiguration of the communication network. This involves individual communication ports being blocked or activated in order to form unique spanning tree paths within the communication network. Specifically, in the case of the example of FIG. 4, a communication port of an Ethernet bridge at the location 40 is blocked ("discarding"). The already previously blocked communication port at the location 35 remains blocked. Therefore, even after the connection has been restored, only unique paths without ring closures in which circling telegrams could arise are produced.

The spanning tree structure of the communication network is recalculated and reconfigured in parallel with the authentication of the devices 32*a*, 32*b*. The reconfiguration can take some time before the messages used for authentication (EAP/AAA) are forwarded correctly. The newly produced path is indicated in FIG. 4 by arrows labeled by way of illustration.

This shows that such messages used for authentication can also reach nodes within the communication network 30 that are not yet authenticated and that are therefore not permitted to interchange operational data telegrams with other nodes. In order that both the reconfiguration and the authentication can be performed correctly, it must therefore be ensured that as yet unauthenticated communication ports are also used to forward messages that are sent in connection with the authentication (EAP/AAA) or with a reconfiguration of the communication network according to the spanning tree protocol (bridge protocol data units—BPDUs). So that such unauthenticated nodes can forward messages relating to the authentication, there may be provision for a special filter function or a VLAN reserved for such messages, which allows specific messages to be sent and received via inherently unauthenticated communication ports.

The authentication server 34 receives the respective authentication information (e.g. contained in the EAP/AAA messages) and, on the basis of this, checks whether the devices 32*a*, 32*b* may be admitted in the communication network 30 as subscribers. For this purpose, the authentication server 34 has access to respective reference authentication information, specific to the devices 32*a*, 32*b*, with which it compares the received authentication information. Alternatively or additionally, it is also possible to check whether a certificate contained in the respective authentication information is trusted.

In accordance with the decision, the authentication server 34 sends authentication responses, which can consist of one or more messages, to the devices 32*a*, 32*b*, which, in the event of successful authentication, open their interconnected communication ports for unrestricted data interchange.

In this way, the devices 32*a* and 32*b* perform the reciprocal authentication with one another. Following successful authentication, the respective devices 32*a*, 32*b* can use their interconnected communication ports to interchange data telegrams with one another.

In practice, it may happen (simultaneously or in succession) that multiple connections are restored or single or multiple nodes (devices or Ethernet bridges) commence their operation. In such a case, the authentication procedure described above is performed for every affected node and its affected adjacent nodes. This can also take place simultaneously. Operational data interchange in the communication network 30 can be commenced only when all affected nodes have been authenticated and the spanning tree reconfiguration has been concluded.

Additionally, it may also happen that authentication requests (EAPOL messages) need to be interchanged via communication ports that are actually blocked according to the spanning tree protocol. This likewise needs to be permitted and is handled in a manner corresponding to the transmission of reconfiguration messages (BPDUs).

Figure 5:
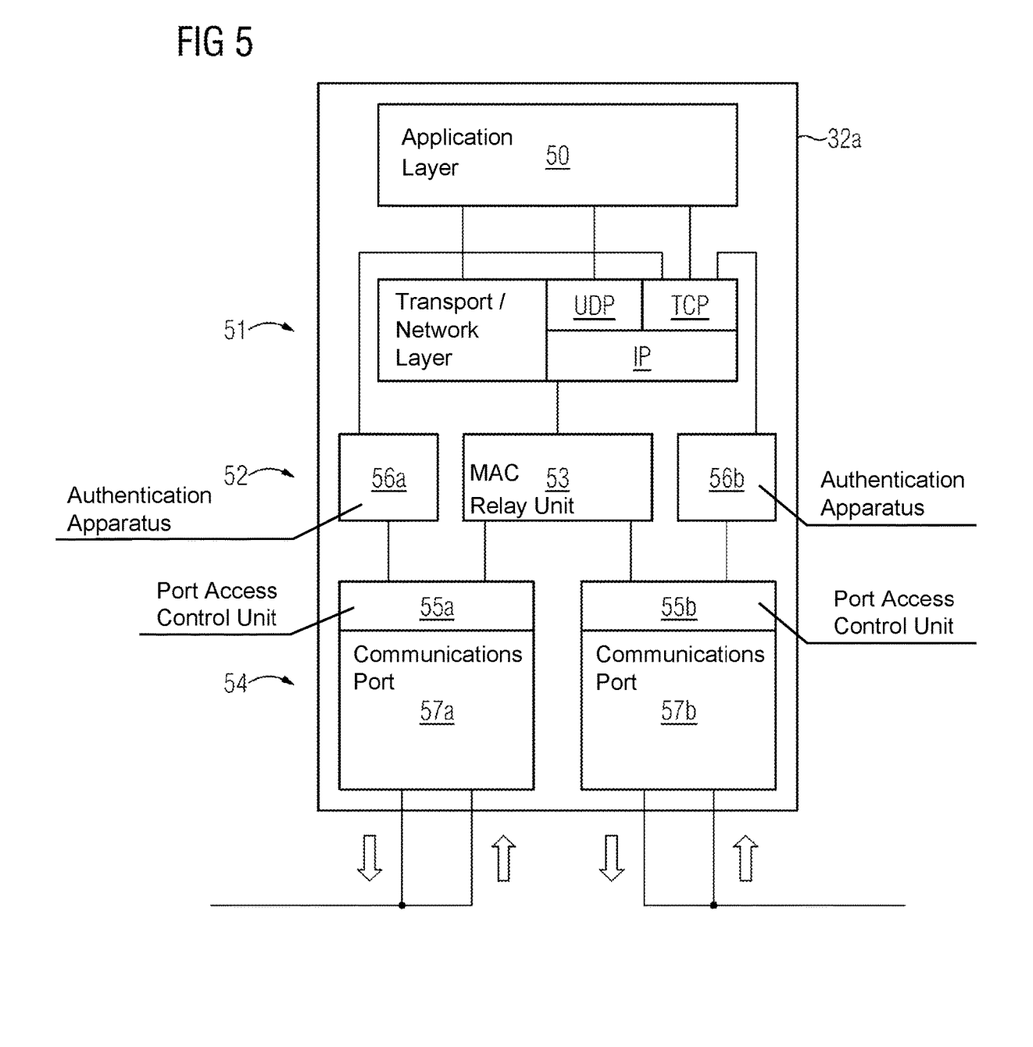
FIG. 5 is a block diagram showing a schematic representation of the design of a node to be authenticated.

FIG. 5, finally, shows the schematic design of the communication structure of a node. The device 32*a* is singled out by way of illustration (the devices 32*a*-32*c* are designed in a manner corresponding to one another in this regard). The device 32*a* has an application layer 50 on which the actual device functions are carried out by means of device software, for example running on a processor, or an integrated logic chip with hardware encoding (ASIC, FPGA) or a combination of these. For the purpose of external communication, the application layer 50 accesses a transport/network layer 51, which has protocol stacks for realtime communication ("hard real-time stack") and the protocols UDP, TCP and IP.

This transport/network layer 51 is connected to an MAC (media access control) relay unit ("MAC relay entity") 53 of a link layer 52, which is responsible for a bridging function between the communication ports of the device 32a and is in turn connected to the first communication port 57a and to the second communication port 57b of the device 32a on a physical layer 54. The communication ports 57a and 57b are connected to the communication network 30, which is only indicated in FIG. 5, for the purpose of data interchange.

A first and a second port access control unit 55a and 55b are arranged between the communication ports 57a, 57b and the MAC relay unit 53 in terms of function. The respective port access control unit 55a or 55b is additionally connected to a respective authentication apparatus 56a or 56b. The authentication apparatuses 56a, 56b are furthermore connected to the TCP protocol unit of the transport/network layer 51.

The device-side authentication is performed as described below. The two instances of the port access control unit 55a and 55b serve as a protocol-less shim and can be implemented within the meaning of IEEE 802.1X-2020 e.g. either as a "port access controller" PAC or as an "MAC security entity" (SecY) with additional data encryption.

Each port access control unit 55a, 55b is connected to a communication port 57a, 57b of the MAC relay unit 53 and to a respective instance of the authentication apparatuses 56a, 56b. The authentication apparatuses 56a, 56b are for example authentication protocol machines according to IEEE 802.1X-2020 and take on the supplicant or authenticator role as appropriate during the reciprocal authentication.

The authentication apparatuses 56a, 56b initiate the authentication of the device 32a by generating the authentication requests and transmitting them via the respective port access controller 55a, 55b for the purpose of transmission to the respective communication port 57a, 57b. Messages (e.g. EAPOL messages) relating to the authentication are thus always interchanged between the respective authentication apparatus 56a, 56b and the respective communication port 57a, 57b.

In the authenticator role, the authentication apparatuses 56a, 56b send and receive the messages used for authentication (e.g. EAP/AAA messages) according to the authenticator role of the standard IEEE 802.1X. Since, as mentioned above, this can involve a transmission also taking place at least in part via an (as yet) unauthenticated connection, the respective authentication apparatus 56a, 56b is internally connected to the TCI/IP protocol stack, with the result that such messages can be forwarded via the MAC relay unit 53. The port access controllers 55a, 55b implement the filter function in this case, which permits such messages to be transmitted between the communication ports 57a, 57b and the MAC relay unit 53 during the authentication process.

After the successful authentication of the devices 32a-32c, the port access control units 55a, 55b ensure that the data interchange takes place between the MAC relay unit 53 and the communication ports 57a, 57b in regular fashion. The port access control units 55a, 55b thus serve as status-dependent changeover switches for the communication between the respective communication port, on the one hand, and the authentication apparatus 56a, 56b, or the MAC relay unit 53, on the other hand.

Ultimately, the authentication is performed independently firstly by the first authentication apparatus 56a for one communication port 57a and secondly by the second authentication apparatus 56b for the other communication port 57b.

In principle, the Ethernet bridges 31 connected to the devices 32a-c perform a corresponding port-based authentication procedure and likewise assume a combined supplicant and authenticator role in accordance with IEEE 802.1Q at the relevant communication ports. The structure of the Ethernet bridges 31 may be in a form corresponding to the above explanation of the design of the devices 32a-32c, the design naturally being matched to the number of respective switch communication ports.

Besides the functional design described for the devices 32a-c and relevant Ethernet bridges 31 in FIG. 5, no changes or extensions are needed in respect of the individual components of the communication network, and so the solution described is fully compatible with the standards IEEE 802.1X and IEEE 802.1Q RSTP.

Figure 6:
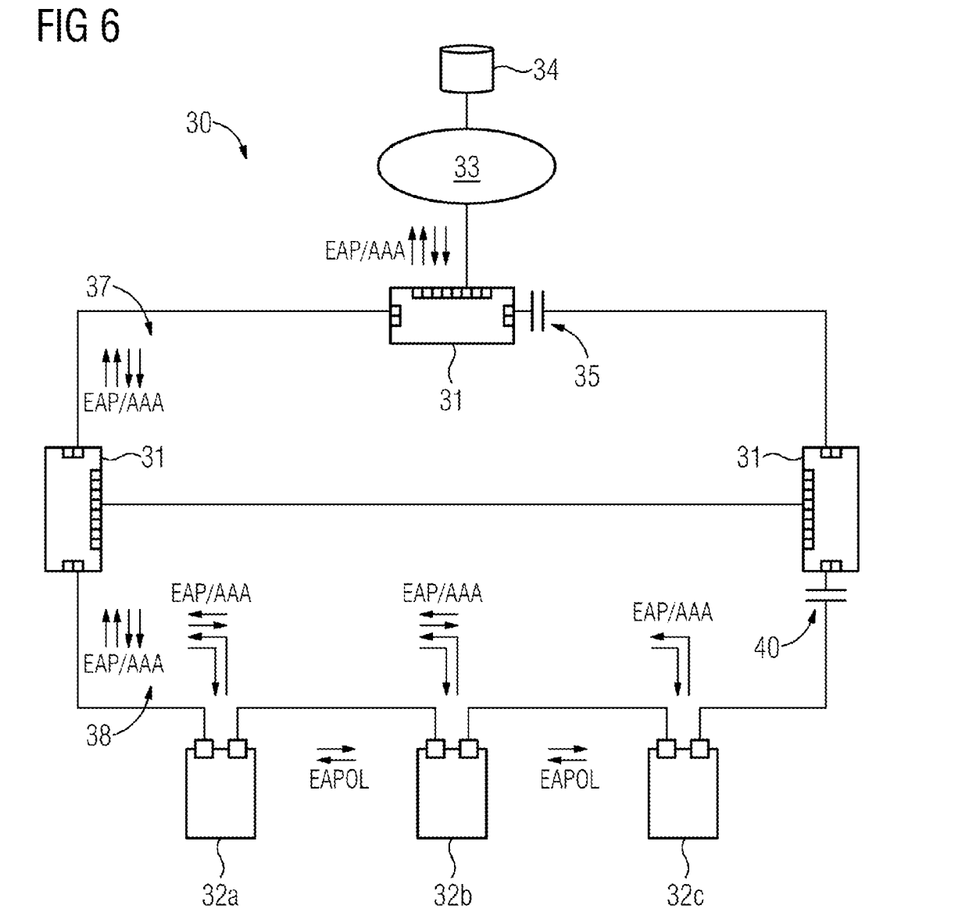

FIG. 6, finally, shows the situation for the authentication of a node that is switched on for the first time or again. It will be assumed by way of illustration that the device 32b has been introduced into the communication network as a substitute device for an old device. After the physical connection from the communication ports of the device 32b to the communication ports of the immediately adjacent devices 32a, 32c has been made, the device 32b is switched on. In a boot process of the device 32b, the communication functionalities of the device are also activated.

In order to be able to interchange data with the other nodes of the communication network operationally, the device 32b needs to be authenticated. This authentication takes place in a port-based manner as reciprocal authentication between first the device 32b and its first adjacent device 32a and second the device 32b and its second adjacent device 32c. The authentication procedure in this case takes place in a manner corresponding to that already described for FIG. 4, each of the processes needing to be applied to the device pair 32a, 32b or 32b, 32c, however.

The authentication server 34 therefore receives a total of four messages containing respective authentication information, two in each case from each of the aforementioned device pairs.

After a successful check, the authentication server 34 sends to each of the affected devices 32a-32c appropriate authentication responses that cause devices 32a-32c to open their respective communication ports for the operational data traffic with the respective relevant neighbor device.

The procedure described is not limited exclusively to RSTP communication networks with ring structures; rather, any spanning tree topologies, e.g. meshed networks, can be used. Additionally, instead of RSTP, it is also possible to use an MSTP spanning tree protocol.

In summary, the invention provides a solution as to how an authentication of a node can be effected in a communication network designed with redundancy. In particular, the authentication is effected in a port-based manner according to the standard IEEE 802.1X in a communication network configured in accordance with the standard IEEE 802.1Q RSTP. The solution described is particularly advantageously usable in industrial automation installations, for example in the context of the automation of energy supply networks. By this means, failsafety, on the one hand, and extremely stringent cyber-security requirements, on the other hand, can be effectively combined with one another.

Although the invention has been more thoroughly illustrated and described in detail above by way of preferred exemplary embodiments, the invention is not restricted by the examples disclosed, and other variations can be derived therefrom by the person skilled in the art, without departing from the scope of protection of the patent claims that follow.

The invention claimed is:

1. A method for authenticating nodes of a communication network of an automation installation, the communication network containing the nodes in a form of Ethernet bridges and electronic devices, each of the nodes having at least two communication ports, which comprises the steps of:
   transmitting respective authentication information indicating the nodes to an authentication server and the authentication server taking the respective authentication information as a basis for admitting or rejecting the nodes in the communication network as subscribers, the transmitting step including the substeps of:
      executing, via the communication network, a spanning tree protocol, which involves at least one of the nodes being instructed to take an operating state of the communication network as a basis for blocking or activating at least one of the communication ports for operational data traffic, at least two of the nodes use mutually facing said communication ports to interchange authentication requests containing the respective authentication information;
      sending, via the at least two nodes, the respective authentication information received to the authentication server connected to the communication network; and
      using, via the authentication server, the respective authentication information received to perform a respective check on an authenticity of a respective node of the nodes and admits or rejects the respective node in the communication network as the subscriber as a result of the respective check.

2. The method according to claim 1, wherein to restore an interrupted communication connection between two of the nodes, the two nodes that are disposed at an interruption location use the mutually facing communication ports to interchange the authentication requests containing the respective authentication information and send the respective authentication information received to the authentication server.

3. The method according to claim 1, wherein when a node is switched on resulting in a switched-on node, the switched-on node and its two adjacent nodes use the mutually facing communication ports to interchange the authentication requests containing the respective authentication information and send the respective authentication information received to the authentication server.

4. The method according to claim 1, which further comprises implement, via the communication network, a spanning tree protocol according to a standard Institute of Electrical and Electronics Engineers (IEEE) 802.1Q rapid spanning tree protocol (RSTP).

5. The method according to claim 1, wherein the nodes of the communication network forward exclusively such messages as are used for authenticating a node or for reconfiguring the communication network according to the spanning tree protocol even if they themselves are not fully authenticated.

6. The method according to claim 1, which further comprises:
   checking the authenticity of the nodes by comparing the respective authentication information received with reference authentication information and/or checking a certificate contained in the respective authentication information for whether it is trusted; and
   admitting a respective node in the communication network in an event of a match.

7. The method according to claim 6, which further comprises sending a respective authentication response to a respective node of the nodes as a reaction to a check, the respective authentication response indicating whether or not the respective node may admit a respective other node in the communication network for a purpose of communication.

8. The method according to claim 1, which further comprises performing a reconfiguration of the communication network with parallel timing in relation to the authentication of the nodes by means of the spanning tree protocol.

9. The method according to claim 1, which further comprises also transmitting the authentication requests via the communication ports that are blocked in accordance with an application of the spanning tree protocol.

10. The method according to claim 1, wherein the nodes each have one first authentication apparatus, which is connected to a first communication port via a first port access control unit, and one second authentication apparatus, which is connected to a second communication port via a second port access control unit, the first and second authentication apparatuses generating the respective authentication request and transmitting it via the first and second communication ports that is connected to it.

11. A node for connection to a communication network of an automation installation, wherein the communication network having multiple nodes in a form of Ethernet bridges and electronic devices, each of the nodes having at least two communication ports, and configured to execute a spanning tree protocol, which involves at least one of the nodes being instructed to take an operating state of the communication network as a basis for blocking or activating at least one of the communication ports for the operational data traffic, comprising:
   the node being configured to perform the method according to claim 1.

12. The node according to claim 11, further comprising:
   a first communication port;
   a first port access controller;
   a second communication port;
   a second port access controller;
   a first authentication apparatus, which is connected to said first communication port via said first port access controller; and
   a second authentication apparatus, which is connected to said second communication port via said second port access controller, said first and second authentication apparatuses being configured to generate the respective authentication request and to transmit it via said first or second communication port that is connected to it.

13. A communication network of an automation installation, the communication network comprising:
   a plurality of nodes in a form of Ethernet bridges and electronic devices, each having at least two communication ports, and configured to execute a spanning tree protocol, which involves at least one of said nodes being instructed to take an operating state of the communication network as a basis for blocking or activating at least one of said communication ports for operational data traffic;
   an authentication server; and
   the communication network is configured to perform the method according to claim 1 in order to authenticate a node of said nodes.

* * * * *